UNITED STATES PATENT OFFICE.

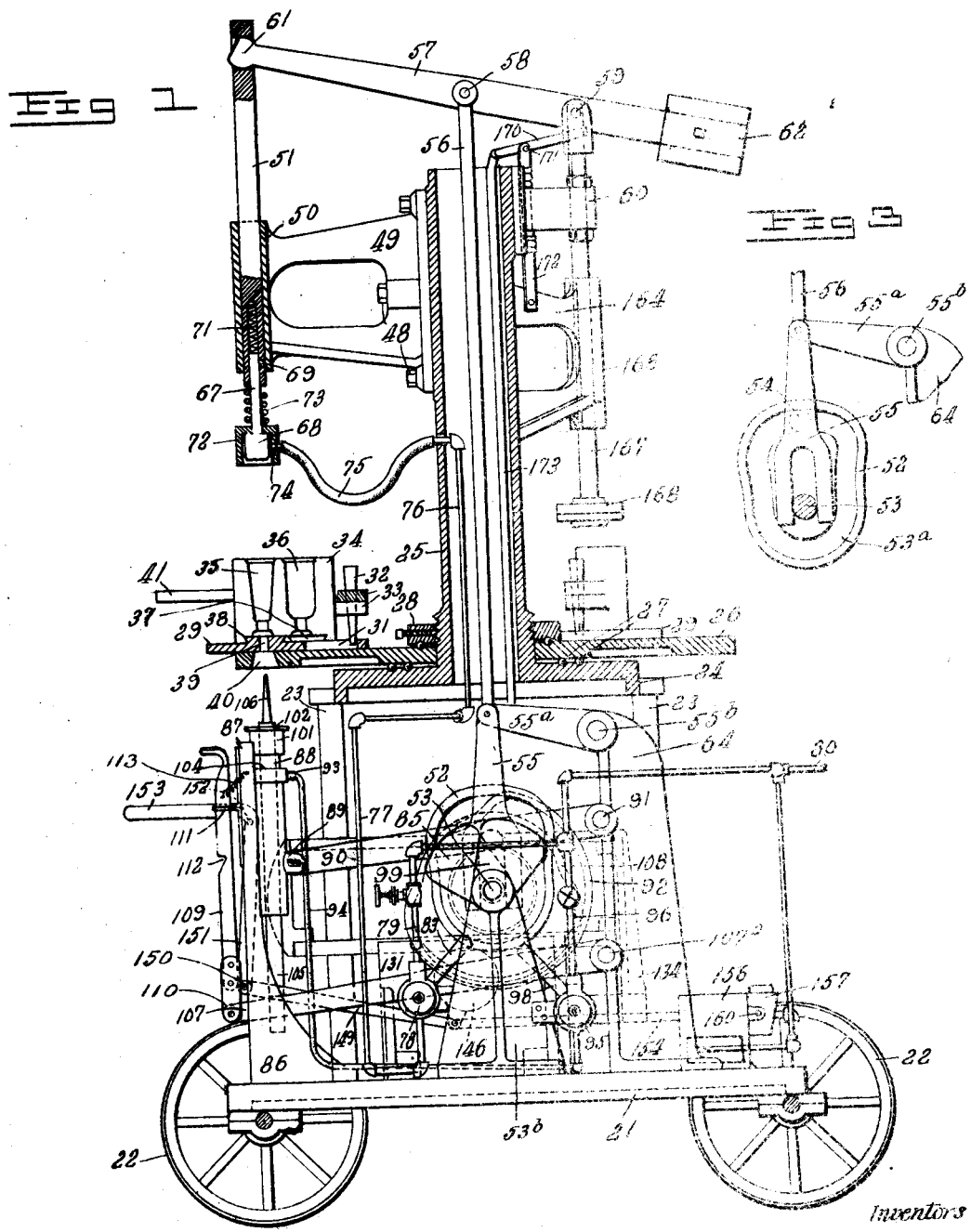

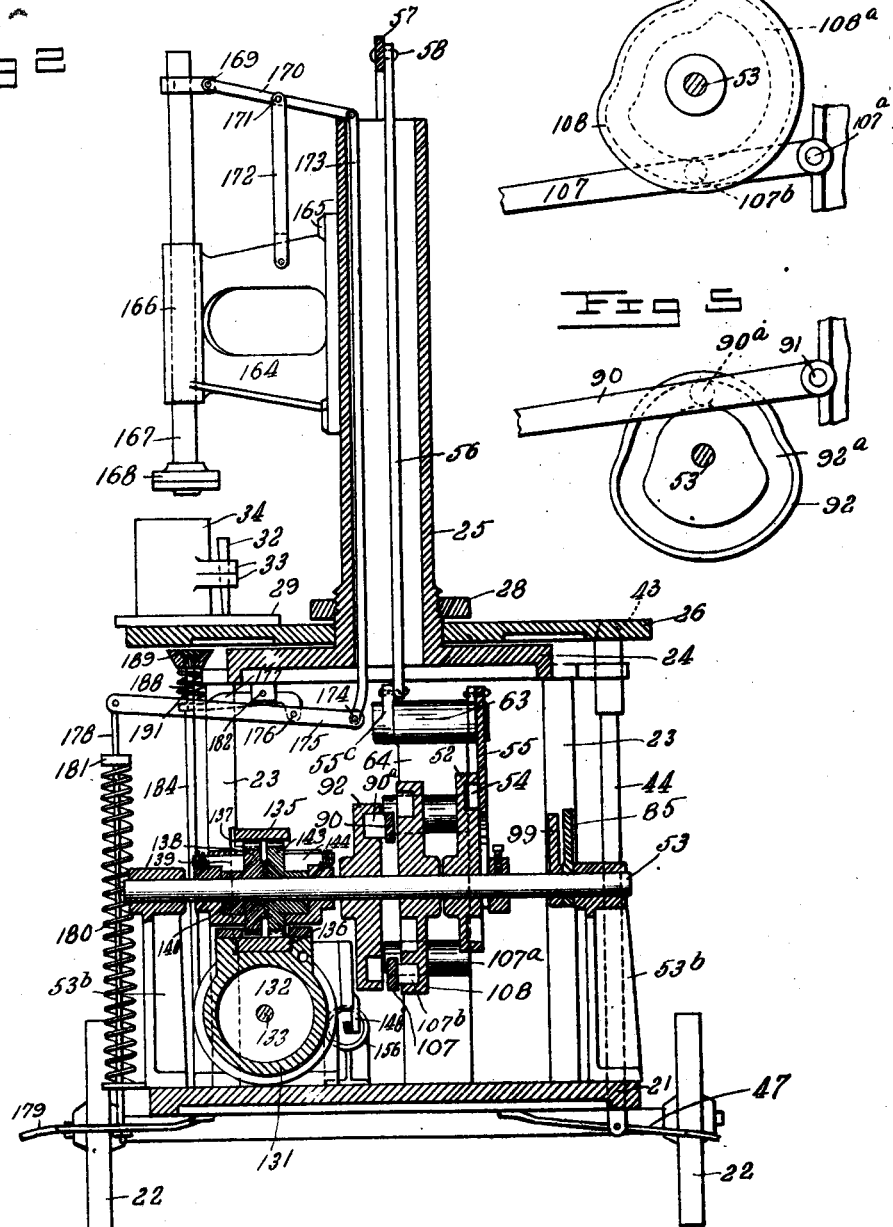

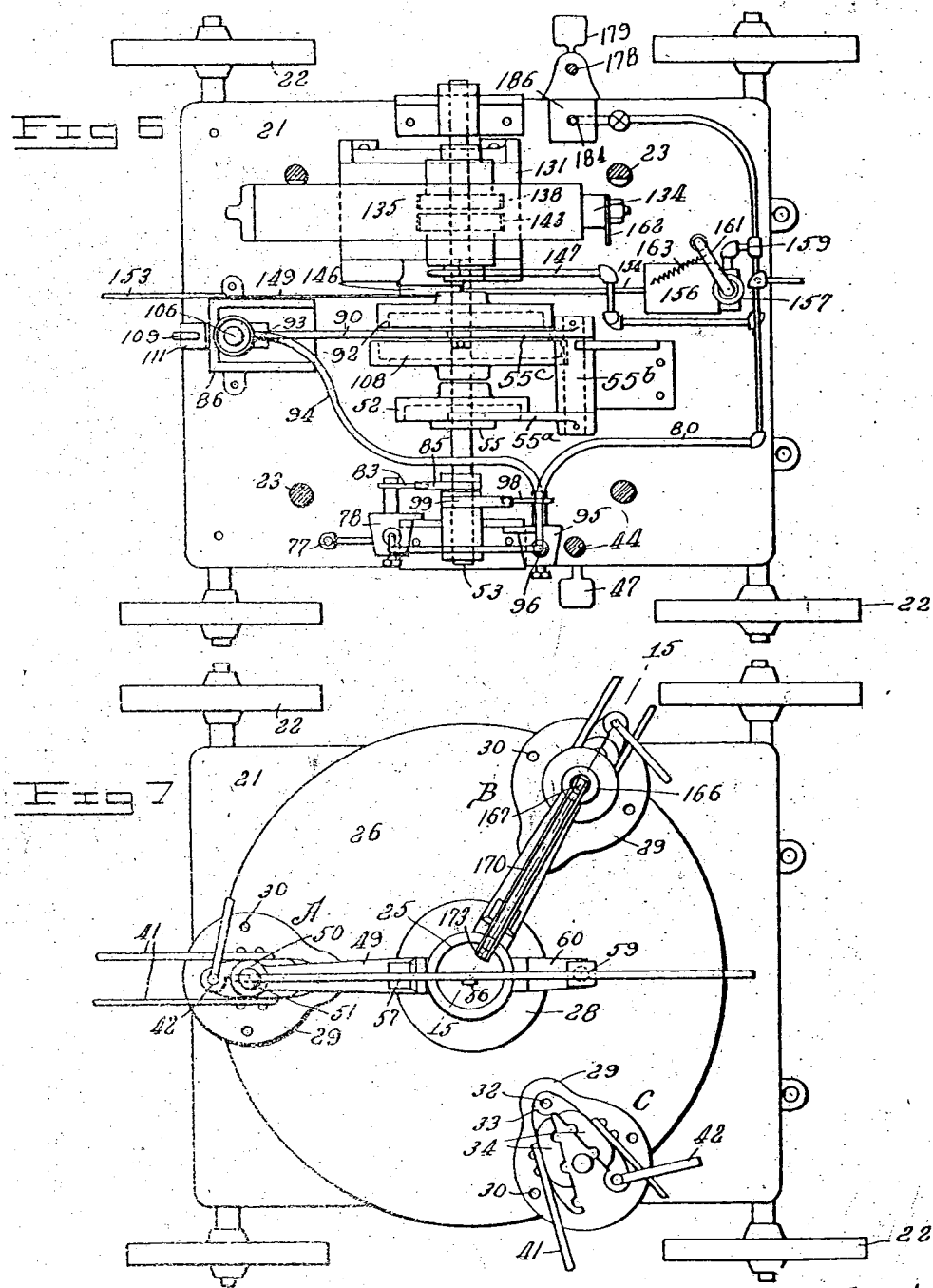

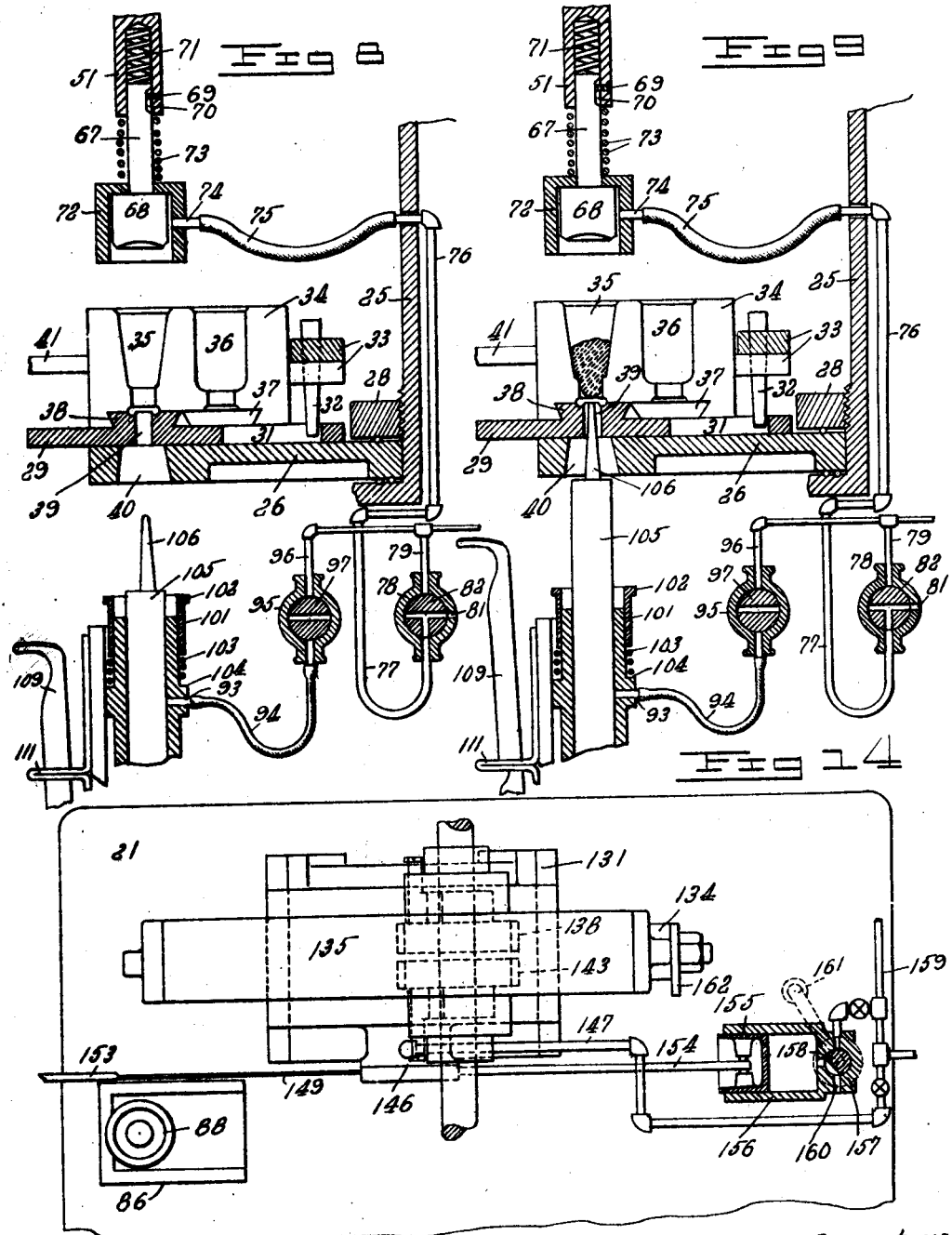

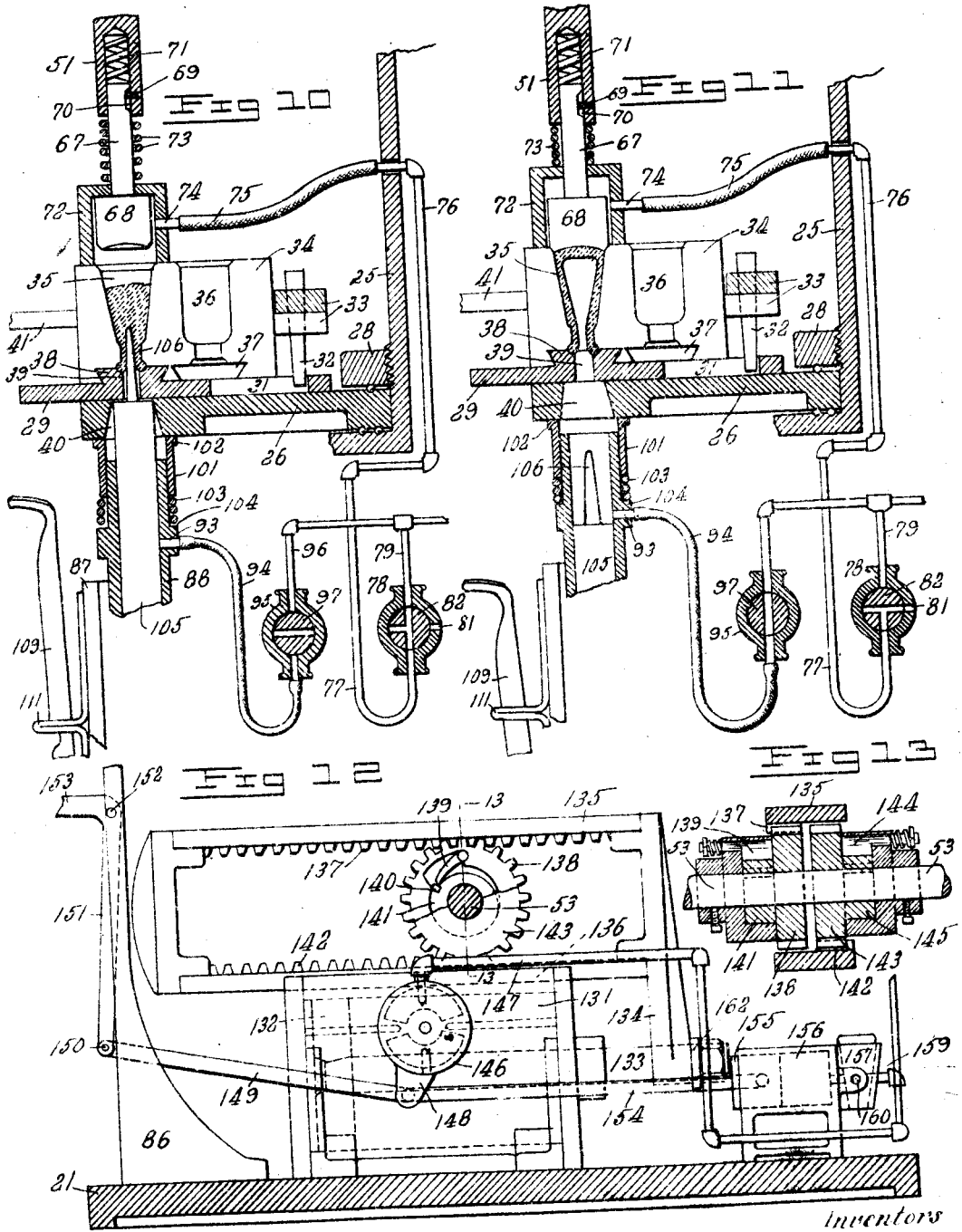

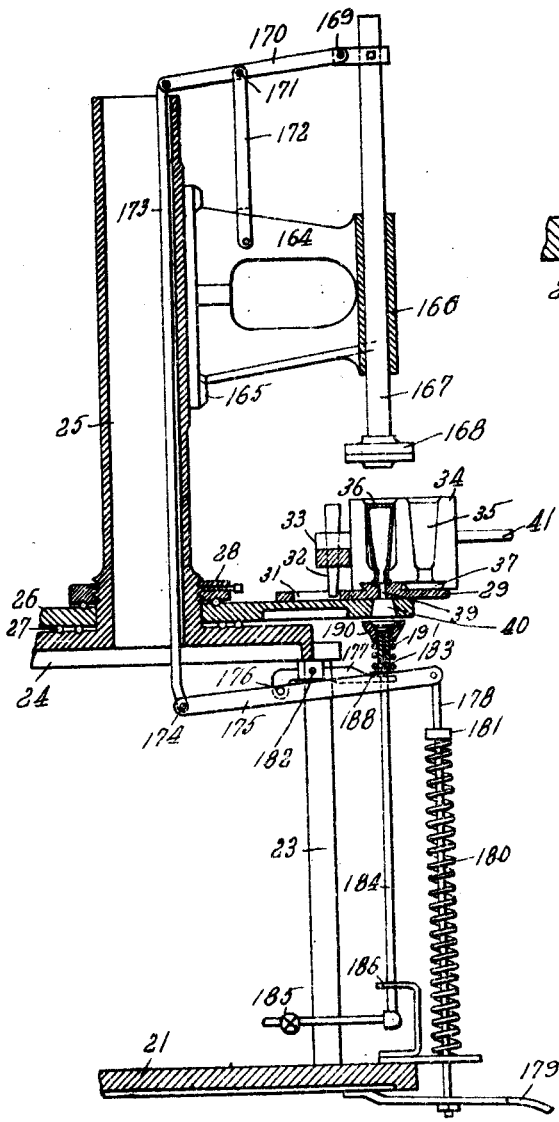
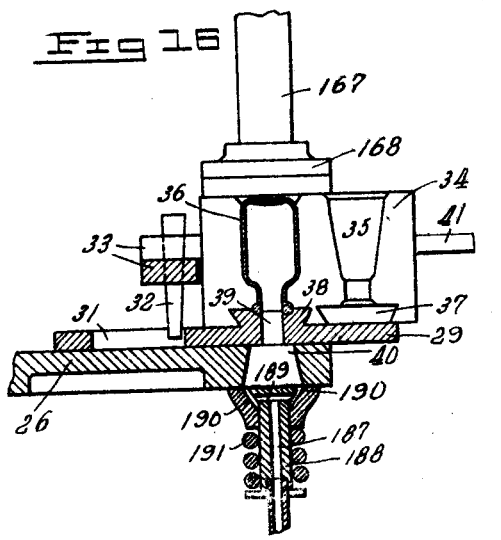
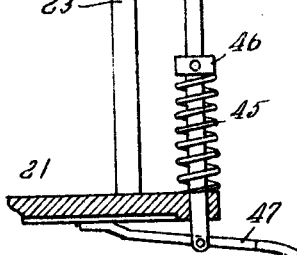

HENRY REEVES LOPER AND WILLIAM H. MILLER, OF BALTIMORE, MARYLAND.

MANUFACTURE OF GLASS BOTTLES.

1,197,837. Specification of Letters Patent. Patented Sept. 12, 1916.

Application filed October 18, 1912. Serial No. 726,457.

*To all whom it may concern:*

Be it known that we, HENRY R. LOPER and WILLIAM H. MILLER, citizens of the United States, residing at Baltimore, in the State of Maryland, have invented certain new and useful Improvements in the Manufacture of Glass Bottles, of which the following is a specification.

This invention relates to the manufacture of glass bottles; and it comprises apparatus for making bottles whereby a bottle blank is first formed neck down in a suitable mold and is given a preliminary blow in said mold, the blank thus formed is then inclosed, still with the neck down, in a finishing mold and is blown to completion; all as more fully hereinafter set forth and as claimed.

The present invention has for one of its objects the simplification of methods of mechanical bottle blowing generally, whereby the number of operations heretofore involved may be reduced and a larger percentage of perfect bottles may be obtained than has been customary with processes and apparatus heretofore known.

Another object of the invention is to provide apparatus particularly suited to the manufacture of narrow neck bottles of a type which it has been impossible hitherto to make in a machine, and whose manufacture by hand has been attended with great difficulty.

In making bottles according to the present invention, a suitable quantity of plastic molten glass is molded into a blank and is usually given a slight preliminary blow in an appropriate mold cavity. The blank thus formed is thereupon blown in a separate and larger mold cavity to form the finished bottle. The blank as formed is in inverted position, that is, with its neck or mouth down; and it remains in this position throughout the succeeding operations of inclosing the blank in the blow mold and blowing to completion. In this respect, in addition to others to be pointed out hereinafter, the process of the present invention is distinguished broadly from two-mold bottle making processes before known. It has been the practice heretofore in processes of this type to complete the bottle by blowing the preformed blank erect or neck up in the finishing mold, whether the blank is formed right side up or inverted. When the blank is formed neck down and then turned over and blown, the operation necessarily involves the additional step of inverting the blank. This lengthens the operation and undesirably prolongs the exposure of the hot blank to the cooling effect of the air. This practice has been due in part to the belief that the assistance of gravity was necessary in the final blowing step in order to insure the requisite lengthening out of the blank and proper distribution of the plastic glass in the mold. We have found however, that contrary to what might be expected a good distribution of glass in the bottle walls may be obtained, and incidentally a lower percentage of "seconds," if the final blowing is performed with the blank standing neck down and if the conditions are carefully regulated and controlled in a manner to be more fully hereinafter disclosed. Furthermore by proceeding in this way we can produce mechanically bottles with very narrow necks, which, as before stated, has not been feasible heretofore. While this method of blowing upward, that is, with the bottle blank and bottle remaining upside down throughout the process, gives excellent results in a two-mold process such as that above described, it is not practicable in a single mold method since the conditions prevailing in the latter method are such as to preclude uniform distribution of the glass in any case.

Another broadly distinguishing feature of the present invention consists in the manner in which the inclosure of the preformed blank by the second or blowing mold is effected. A common practice heretofore has been to employ a horizontally divided mold comprising a ring-like neck and shoulder portion adapted to register successively with two body mold cavities provided in another portion. The first is the blank-forming cavity, somewhat smaller than the finished bottle and of different shape, while the second is the blow or finishing cavity in which the distribution of glass in the walls of the bottle body is effected and the lower part of the bottle receives its final contour. In using such molds the neck mold is first assembled with the blank mold cavity and the bottle blank formed. Then without disturbing the neck and shoulder ring, the separable body mold is opened and the neck and shoulder ring together with the blank held thereby are shifted into alinement with the sections of the finishing cavity, and the body mold is closed, thus inclosing the body of the blank in the finishing cavity where the final blowing takes place. Instead of thus shifting the neck mold and blank, they may remain stationary while the body mold is moved, after being opened, to bring the blow cavity into a position such that the blank body may be inclosed therein by closing the body mold. Whichever plan of operation is adopted necessarily involves uncovering the body portion of the bottle blank during the shift and thus subjecting it to the temperature of the surrounding atmosphere; a temperature which is cooler than that of the mold in contact with the neck and shoulder of the blank, which latter of course remain inclosed by the neck ring. This induces differential temperature strains in the bottle which subsequent annealing does not necessarily remove. Where the bottle blank and the neck mold are moved, instead of moving the mold, there is the further danger of distorting the bottle blank during the transfer. According to the present invention these disadvantages are avoided by employing a mold comprising two complete mold cavities; that is, each cavity has a body portion and a neck and shoulder portion continuous therewith, not separable into an upper and lower portion. One of said cavities is a blank forming cavity and the other a blowing cavity; and the mold as a whole is separable laterally on a vertical plane. In use, the blank is formed upside down in the blank cavity, the mold parts are then separated, leaving the formed blank standing on its mouth or neck and supported only by a base plate. The mold is then shifted sufficiently to bring the blowing cavity into a position where the mold may be closed with the blank in the blowing cavity where the blank is blown into final form. By operating in this way there is no danger of distorting the blank and the danger of setting up excessive temperature stresses is reduced. Furthermore the formation of a seam on the neck or shoulder of the bottle, something hardly avoidable with molds used heretofore, is done away with. This method of forming a bottle, whether the blank and bottle be right side up or inverted, I believe to be novel; but it is of special advantage where, as in a specific embodiment of our new process, both the blank and the bottle are inverted throughout their formation.

Our new process, taken as a whole, may be briefly described as follows: Molten glass of the proper plasticity is introduced into the blank-forming cavity of a mold of the type described in the paragraph next preceding, in which the blank and bottle are to be formed and remain neck down. Through an orifice in the bottom of the mold, a plunger is inserted into the neck of the cavity and into the mass of molten glass therein. Fluid pressure, advantageously air pressure, is then applied to the upper surface of the glass in order to force the glass down into close contact with the neck and shoulder portion of the mold in order to completely fill out these portions of the mold and to form these parts of the bottle perfectly. The plunger is then withdrawn, while a bottom-forming member or other suitable closure is placed so as to close the upper end of the mold and complete the blank cavity. Compressed air is then admitted into the neck of the mold and into the channel in the molten glass left by the withdrawal of the plunger. The admission of the air partially blows or hollows out the blank from which the bottle is to be subsequently completed and produces a blank of an exact predetermined length and whose walls are of substantially uniform thickness. By means of a suitable arrangement of apparatus elements to be described later, the step of forming the blank as just described may be caused to occur in accurately timed and extremely rapid sequence. After the blank is thus formed, the bottom-forming member is removed from the mold, the mold is opened and shifted so that the walls of the blowing cavity may be closed around the blank, and the mold is closed again. During this shift the blank stands on its neck on a supporting plate. The upper end of the mold is then closed by a bottom-former and compressed air is admitted at the lower end to blow the blank into the finished bottle. The bottle is then removed from the blow cavity and receives the usual final treatment such as annealing, etc.

The apparatus which we have devised and which is best used in carrying out our improved process of making bottles comprises a plurality of molds of the character above described arranged on a revoluble table. Suitable blowing and pressing heads for forming blanks and shaping complete bottles are arranged above and below said table and in operative relation thereto. By revolving the table, any mold may be brought into a position adapting it to coöperate with any desired head or set of heads, appropriate actuating and controlling devices being provided whereby the described operations required in the blank forming and blowing steps are made to occur in proper sequence. The operation of the apparatus may be substantially continuous, the formation of blanks and the final blowing operation occurring simultaneously on different parts of the table.

In the accompanying drawings is illustrated a typical embodiment of apparatus elements useful in carrying out the process of the present invention.

In these drawings, Figure 1 is a vertical longitudinal section of the complete apparatus, parts being shown in elevation; Fig. 2 is another vertical section taken at right angles to the plane of Fig. 1; Figs. 3, 4, and 5 are details of the actuating cams; Fig. 6 is a plan view of the apparatus with the column and table removed; Fig. 7 is a plan of the complete apparatus; Figs. 8, 9, 10, and 11 are enlarged sections illustrating the operation of the blank forming mechanism; Fig. 12 is an elevation of power means for operating the machine; Fig. 13 is a section on the line 13—13 of Fig. 12; Fig. 14 is a plan of the parts shown in Fig. 12; Fig. 15 is a vertical section on line 15—15 of Fig. 7; Fig. 16 is a sectional detail of a part of Fig. 15 on a larger scale; and Fig. 17 is a sectional detail showing means for locking the table.

Referring to the drawings, 21 is a base mounted for convenience on wheels 22 and carrying supporting members 23 on which is mounted the foot 24 of hollow column 25. Table 26 is mounted for revolution about the central column as on ball bearings 27, and may be held in place by threaded collar 28.

Base plates 29 are suitably secured as at 30 to the revolving table. Each base plate is slotted or grooved at 31 to receive the lower end of hinge pin 32 passing through lugs 33 at the rear of a pair of separable mold sections 34 each of which has formed on its inner face one half of blank forming cavity 35 and blowing or finishing cavity 36. Below each mold cavity is a dovetailed cavity 37 adapted to engage dovetailed boss 38 on the base plate, each boss having a central passage 39 extending therethrough into coned passage 40 in the revolving plate. The boss may be provided on its upper side with a shallow annular recess conforming in contour with the rounded edges of a bottle mouth. The molds described are open at their upper and lower ends. Means for completing the mold structure at appropriate periods will be hereinafter described.

The mold sections are conveniently provided with handles 41 and are slidable on the base plate when the mold is open sufficiently wide. Clamping means of any suitable type may be provided at 42 for holding the molds closed when the sections are brought together. Slot 31 is of such length that when the end of the hinge pin is at the inner end of the slot, or the end nearest the column, the dovetailed cavity beneath the blank mold cavity is in position to engage the locking boss 38 when the mold sections are brought together. When the mold is opened and moved outwardly on the base plate until the end of the mold pin reaches the outer end of the slot, the dovetailed cavity beneath the blowing cavity will engage the boss upon closing the mold.

Any convenient number of molds may be mounted on the revolving table. In the present instance three molds are shown spaced around the table at intervals of 120 degrees. The table may be provided with locking holes as at 43 to receive the end of locking rod 44 pressed upwardly by spring 45 bearing against collar 46, treadle 47 being provided for withdrawing the rod to release the table. By this means the table after being rotated to bring a mold into any desired position may be locked in place temporarily. Arranged to coöperate with the molds during the blank-forming phase of the process, as each mold is brought into operative position relative thereto by revolution of the table, are a pair of devices, one arranged to operate at the upper and the other at the lower end of the blank mold. These will now be described in detail. Secured to the central column as by bolts 48 is bracket 49 provided with vertically disposed sleeve 50 within which rod 51 is arranged to reciprocate with a sliding fit. The movements of this rod are controlled through suitable connections by cam 52 fixed on cam shaft 53 and provided with track or slot 53$^a$. The cam shaft is suitably journaled on standards 53$^b$. Follower 54 on member 55 is arranged to work in the cam track, member 55 being forked at its lower end to straddle the cam shaft. Member 55 is pivoted to arm 55$^a$ fast with rock shaft 55$^b$, said rock shaft carrying arm 55$^c$ pivoted to rod 56, which in turn is pivoted to the long arm of lever 57 at 58. Lever 57 is fulcrumed at 59 on a bracket 60 secured to the central column, and one end 61 of the lever is rounded to engage a rounded bearing in the end of rod 51. A counterpoise 62 may be adjustably secured to the short arm of the lever. Rock shaft 55$^b$ is carried in a bearing 63 on upright support 64.

The lower part of rod or arm 51 is centrally bored or otherwise formed to slidably receive stem 67 of a former 68. Any convenient means for securing the stem within the rod may be employed, the arrangement shown being convenient and comprising a threaded stud 69 which extends into a longitudinal groove 70 in the stem, thus permitting limited longitudinal movement of the stem in the rod bore. A spring 71 maintains the parts normally in the relative positions shown, for example, in Figs. 1 and 10. An air head or cylindrical box 72 open at the bottom is of somewhat greater height and diameter than former 68, for a purpose appearing hereinafter, and has a central opening in its top through which extends the stem 67. Air head 72 is normally held in contact with the upper side of former 68 by the pressure of spring 73.

Air inlet 74 is connected by flexible tube 75 to air pipe 76, conveniently arranged within the hollow column and leading by way of piping 77 to valve 78 controlling the admission of compressed air or other suitable fluid received through 79 and 80 from any convenient source of supply. The valve has an exhaust opening 81 and is provided with a 3-way plug 82 operated by a controlling arm 83, normally held in the position shown in Fig. 1 by a spring (not shown), but located in the path of cam 85 on shaft 53 and arranged to be moved thereby at proper intervals in a manner to be explained hereinafter.

Bolted or otherwise secured to the machine base is standard or support 86 whose upper portion 87 is formed to slidably support a sleeve-like member or block 88 which is suitably engaged at 89 by one end of lever 90 carrying a cam follower 90ª whose opposite end is secured to rock shaft 91 carried in a suitable bearing on support 64. Cam 92, mounted on cam shaft 53, has a track or slot 92ª arranged to engage cam follower 90ª and thereby to actuate the lever 90 and to shift the sleeve vertically. Air inlet 93 has a flexible connection 94 to valve 95 controlling the passage of compressed air derived through valved connection 96 from any convenient source of supply, as 80. The position of the perforated valve plug 97 is controlled by arm 98 connected thereto and located in the path of cam 99 on shaft 53, whereby the arm is moved at proper intervals from the position in which it is normally maintained by a spring (not shown) to actuate the valve.

Surrounding the upper part of 88 is a short sleeve 101 flanged at 102 and supported by spring 103 bearing against the lower edges of the sleeve and against shoulder 104. A rod 105 arranged to work within member 88, carries at its upper end a relatively slender plunger 106; while its lower end is suitably engaged by lever 107, one end of which is secured to rock shaft 107ª journaled on support 64. This lever is arranged to be actuated through follower 107ᵇ suitably secured thereon and driven by cam 108 mounted on the cam shaft and provided with track 108ª in which said cam follower works. The rotation of the cam shifts the lever and thereby shifts rod 105 and plunger 106 vertically as may be desired. Supplemental means may also be provided for shifting rod 105 upward by hand, the track of cam 108 being shaped as at 108ᵇ (Fig. 4) to permit this when the parts are in the position shown in Fig. 1. Such supplemental means may comprise a hook rod 109 pivoted at 110 to lever 107 and extending through a slot in plate 111 adjustably secured to the standard. A notch 112 in the lever is arranged to be engaged by an edge of the slotted plate when the hook rod is pulled up a suitable distance and then outwardly in order that plunger 36 may be held in an elevated position, temporarily independent of the cam movement. Spring 113 has sufficient tension to draw the hook lever normally away from the outer edge of the slot in plate 111, but is not strong enough to thus draw the rod away when the slot edge engages the notch in the rod, and the weight of the rod and the attached parts rests on the slot edge.

For driving the cam shaft any suitable driving means may be employed. For example, an electric motor may be geared thereto; and under some conditions, the employment of such driving means has distinct advantages. The driving device here illustrated may be employed however, and has proved useful in actual service. Referring particularly to Figs. 12, 13, and 14, compressed air cylinder 131 is provided with a piston 132 to which is secured piston rod 133 arranged to reciprocate through a suitable opening in one end of the cylinder. Rigidly connected to the piston rod as by arm 134 is yoke 135 arranged to slide on the top of the air cylinder in a groove or other suitable way 136. This yoke carries an upper rack 137 meshing with a toothed annulus 138 carrying a spring controlled pawl 139 which is arranged, upon rotation of the annulus in one direction, to abut against detent 140 on collar 141 keyed to cam shaft 53. The yoke is also provided with a lower rack 142 meshing with toothed annulus 143 having pawl 144 which engages a detent on collar 145 keyed to the cam shaft, the ratchet mechanism thus operated by the lower rack being arranged to rotate the cam shaft in the same direction as the corresponding mechanism just described in connection with the upper rack. With the parts in the position shown in Figs. 12 and 13 movement of the yoke toward the right causes the lower rack to rotate annulus 143 in a counterclockwise direction and thus to drive the cam shaft in the same direction. During this movement, annulus 138 is rotated in clockwise direction by the upper rack without affecting the rotation of the cam shaft. Upon moving the yoke toward the left, conditions are reversed, and annulus 138 now rotates the shaft counterclockwise, while annulus 143 turns clockwise without driving effect. In whichever direction the yoke is moved, the cam shaft is always rotated counterclockwise as shown in Fig. 12.

Oscillatory valve 146 admits compressed air from 147 to either end of the air cylinder and may be turned by arm 148 to which is pivoted rod 149, the latter being pivoted in turn at 150 to one arm 151 of a bent lever pivotally secured at 152 to standard 86, the other arm 153 of the bent lever serving as a starting handle. The compressed air cylinder is provided with exhaust means which may be controlled by the same valve mechanism governing the admission of compressed air.

Rod 154 is pivoted at one end to arm 148 and at the other to piston 155 arranged to be reciprocated in auxiliary air cylinder 156, having a valve 157 whose plug 158 may be turned to place the interior of the cylinder in communication either with compressed air pipe 159 or with the atmosphere through orifice 160. Secured to the valve plug is an arm 161 whose end is in the path of travel of a lug 162 carried by the piston rod of the main cylinder, the parts being so arranged that when the main piston nears the end of its stroke, the valve arm is engaged and moved to open valve 157 to admission. The valve is held normally open to exhaust by spring 163 or other suitable means. The function of the auxiliary air cylinder and accessory parts is to provide means for reversing the travel of the gear yoke by reversing valve 146 as the main piston approaches the end of its stroke.

Referring now particularly to Figs. 15 and 16 showing the mechanism for blowing the preformed blank, arm or bracket 164 is secured as by bolts 165 to the central column and is provided with a vertical sleeve or bored portion 166 adapted to receive reciprocating rod 167 which carries at its lower end a pressing head or bottom former 168. The reciprocating rod is adjustably pivoted at 169 to one end of lever 170 fulcrumed at 171 on strut 172 pivoted to the bracket. The other end of the lever is pivoted to rod 173, which extends downwardly within the hollow column and is pivoted at 174 to one end of lever 175 which is movably fulcrumed at 176 on one arm of lever 177. The other end of lever 175 is pivotally joined to rod 178 operated by treadle 179, the parts being normally held in the position shown in Fig. 15 by the upward thrust of spring 180 against collar 181 fixed to the treadle rod.

Lever 177 has a fixed fulcrum at 182 and its free arm is forked or otherwise formed to engage pins 183 or the like fixed to the upper end of air pipe 184 valved at 185 and flexibly connected to a source of compressed air supply. Guide 186 prevents lateral displacement of the air pipe. The upper end of the air pipe registers with passage 187 in hollow valve stem 188, said passage leading to cross-passage 189 in the coned valve head which is normally seated against valve casing 190 by the pressure of spring 191.

The method of employing the described apparatus in carrying out our new process is sufficiently obvious from the above description. Assuming the various parts to be in the position shown in Figs. 1, 8 and 12, molten glass of the requisite degree of plasticity is dropped into blank cavity 35 and is cut off by the operator. Hand lever 153 is then pushed down to operate valve 146 whereby compressed air is admitted at the left of the piston in the main air cylinder, thus causing the piston to move toward the right and to move the geared yoke in the same direction. This rotates the cam shaft in counterclockwise direction, whereupon the cams function as follows: cam 108 raises lever 107 and thereby lifts the plunger rod 105 until plunger 106 is forced up to the position shown in Fig. 9. At the same time cam 52 operating through 54, 55, 55ª, 55ᵇ, 55ᶜ, 56, 57, and 51, forces air head 72 down to the position shown in Fig. 10, slightly compressing spring 73 and thus holding the air head in close contact with the top of the mold to close the upper end of the blank forming cavity. By the time the air head has reached this position cam 85 has operated 3-way valve 78 to the position shown in Fig. 10, allowing compressed air to enter above the glass in the blank mold and to force it compactly down into the neck of the mold and around plunger 106. The use of fluid pressure in this operation is far more efficient and satisfactory than the application of mechanical pressure as by a plunger or pressing head. This done, cam 85 passes the valve lever of valve 78, allowing the lever to be drawn back by its spring into its normal position as indicated in Fig. 1. This return of the valve to its normal position opens exhaust port 31, as shown in Fig. 8, and relieves the pressure in air head 2. The air having been cut off from the air head by the closing of valve 78, cam 92 acting through follower 90ª upon lever 90 causes sleeve 88 to rise until the flange of small sleeve 101 is forced into contact with table 26, compressing spring 103 as shown in Fig. 10. The continued operation of cams 108 and 52 then causes two movements to take place simultaneously. Plunger rod 105 is withdrawn to a position below air inlet 93, while a further movement of rod 51 compressing spring 73 forces former 68 into contact with the upper surface of the blank mold and slightly compresses spring 71. Cam 99 then strikes arm 98, allowing compressed air to enter the blank through the neck opening and thus blowing up the blank until it fills the entire blank cavity and completes the bottle blanks. This method of operation insures blanks of uniform length and contour in which the glass has been given a preliminary distribution enabling the production of finished bottles having walls of uniform thickness.

The bottle blank having been formed as described, sliding sleeve 88 and rod 51 are then withdrawn by the operation of their respective cams to the positions shown in Figs. 1 and 8, leaving the completed blank standing in the blank cavity of the mold. The table is then revolved with the blank still remaining in the blank cavity, until the mold registers with the blowing mechanism. The mold is then opened leaving the blank standing on its neck on the dovetailed boss 38. The mold is then drawn forward until the end of the hinge pin comes into contact with the outer end of the groove in plate 26, whereupon the mold is closed around the blank, the position of the parts at this time being clearly shown in Fig. 15. Foot treadle 179 is then pressed down, forcing rod 173 upward and causing rod 167 to be forced down until the bottom former or closing head 168 is pressed into contact with the top of the mold, thus completing the blowing cavity. Further pressure on the treadle causes the short arm of lever 177 to be drawn down, thus forcing valve casing 190 into contact with the under side of table 26, compressing spring 187, and lifting the valve head off its seat (Fig. 16) and allowing compressed air to flow through the hollow valve stem in the transverse passage of the valve head into the blowing cavity. The blank is thus blown until it fills the bottle cavity of the mold and forms the complete bottle. On releasing the pressure on the treadle 179, spring 180 causes the bottom former and valve to be withdrawn to the position shown in Fig. 15.

After the bottle is thus completed the table is revolved into a third position where the mold is opened, and the finished bottle is removed. By reference to Fig. 7 the practically continuous operation of the machine is clearly apparent. While the blank is being formed at A, a bottle is being completely blown at B, and a bottle previously blown is being taken out of the mold at C, this last mold being then ready to return to A to receive another batch of glass for another blank.

During the steps of forming the blank the cam shaft makes one revolution, causing the cam-actuated parts to perform a complete cycle of operations necessary to form the bottle blanks. The positions of the cams on the cam shaft relative to each other are of course such as to cause the operations to occur at the proper time and in proper sequence. It is to be noted that the train of mechanism whose operation forms the blank is set in motion by an initial actuation, that is by pushing the starting lever 153. The cycle of operations then proceeds automatically until the blank is completed, the mechanism stopping when it has returned to its initial position.

A single revolution of the cam shaft is accomplished by two strokes of the piston in the compressed air cylinder, one to the right and one to the left, which cause the two racks carried by the geared yoke to act successively through their respective ratchet connections in such a manner as to produce the complete revolution of the cam shaft as before described. The reversal in the direction of piston travel is accomplished by the automatic operation of the auxiliary air cylinder and piston in the following manner: As the main piston nears the end of its stroke to the right, the lug 162 on the piston rod strikes the valve lever arm 161 thus turning valve plug 158 and placing the auxiliary cylinder in communication with the compressed air supply. The auxiliary piston, which at this time is close to the right hand end of its cylinder, is thus caused to move toward the left, which reverses valve 146 and admits compressed air at the right of the main piston, thus reversing its direction of travel and also that of the geared yoke, and continuing the rotation of the cam shaft.

As here illustrated, the table is intended to be revolved by hand. It is obvious however that the table may be revolved by any suitable mechanical means, and the operation of such means may of course be timed so that the revolution of the table will occur automatically at the proper intervals.

The operation of the machine as above described may be somewhat modified where the bottle to be made has a large neck opening or the glass to be used is exceptionally soft. In such cases the fluent glass has a tendency to run down into the passage 39, so that when the plunger 106 is forced into position, the glass causes it to jam in said opening. In order to avoid this difficulty, hook rod 109 may be pulled upward prior to the introduction of glass into blank cavity 35, until notch 112 is engaged by the edges of the slot in plate 111, the track of cam 108 being shaped, as before stated to permit this shift. This preliminary upward movement of the hook rod elevates the plunger into the position illustrated in Fig. 9. The glass for the blank is then introduced into the blank cavity as before and the lever 153 is pushed down to start rotation of the cam shaft. Cam 108 finally acts through follower 107b upon lever 107 in its elevated position and forces it, together with the hook rod, still higher, the plunger being carried to its highest point within the blank cavity as in the usual method of operation. As soon as the hook lever is thus lifted, its controlling spring 113 draws it in toward the supporting standard so that on the downward travel of the lever and hook rod the notch passes clear of the slot edges in plate 111 and does not interfere in any way with the return of the plunger rod to its lowest position. When the hook rod is given the preliminary shift before described to bring the plunger into initial position, the weight of the hook rod and of the lever attached to it bearing on the slot edges engaging the notch, is sufficient to prevent the spring 113 from drawing the lever out of this position. Save for this preliminary manipulation of the hook rod under the circumstances mentioned, the operation of forming the blank and blowing the completed bottle are exactly the same as before described.

The arrangement of the blank-forming and blowing cavities in the mold may of course be reversed, in which case the blank forming cavity would be near the rear of the mold and the blowing cavity toward the front.

What we claim is:—

1. Apparatus for making glass bottles comprising, the combination, with a horizontal revoluble table provided with a plurality of passages extending therethrough, of a plurality of separable molds movably mounted on said table, each having a blank forming cavity and a blowing cavity and arranged for adjustable registry of either cavity with one of said passages, blank forming mechanism comprising suitable blank forming elements located above and below said table and arranged to coöperate with the blank forming cavity of any of said molds when such cavity is in registry with the corresponding passage through the table and when such cavity and passage are in substantial vertical alinement with said elements, and bottle blowing and shaping mechanism located at a suitable distance from said blank forming mechanism and comprising elements arranged above and below said table, said blowing and shaping mechanism arranged to coöperate with the blowing cavity of any of said molds when such cavity is in registry with the corresponding passage through the table, and when such passage and cavity are in substantial vertical alinement with the elements of said blowing and shaping mechanism.

2. Apparatus for producing glass bottle blanks comprising the combination, with a suitably mounted blank mold having a cavity adapted to form a bottle blank with its neck down, of auxiliary blank forming mechanism comprising a blowing head arranged for operative connection to the lower end or neck of said mold cavity, a reciprocable plunger coöperating with said blowing head and arranged to be projected into and to be withdrawn from the neck of said mold cavity, a blowing head arranged for operative connection to the upper end of said cavity, and a movable bottom former located within said last mentioned blowing head and arranged to close the upper end of said cavity when suitably actuated.

3. Apparatus for producing glass bottle blanks comprising the combination, with a suitably mounted blank mold having a cavity adapted to form a bottle blank with its neck down, of auxiliary blank forming mechanism comprising a blowing head arranged for operative connection to the lower end or neck of said mold cavity, a reciprocable plunger coöperating with said blowing head and arranged to be projected into and to be withdrawn from the neck of said mold cavity, a blowing head arranged for operative connection to the upper end of said cavity, a movable bottom former located within said last mentioned blowing head and arranged to close the upper end of said cavity when suitably actuated, and means for actuating each of the elements of said auxiliary mechanism in predetermined sequence.

4. Apparatus for producing glass bottle blanks comprising the combination, with a suitably mounted blank mold having a cavity adapted to form a bottle blank with its neck down, of auxiliary blank forming mechanism comprising upper and lower blow heads arranged for operative connection to the upper and lower ends, respectively, of said mold cavity, a reciprocable neck former or plunger arranged below said mold cavity in operative relation to the lower end thereof, a movable bottom former or closure arranged above said mold cavity, a cam shaft, cams mounted thereon and arranged to actuate the enumerated members of said auxiliary mechanism in predetermined sequence upon revolution of said shaft, and driving means arranged to revolve said shaft through a complete cycle of blank forming operations automatically.

5. Apparatus for producing glass bottle blanks comprising the combination, with a suitably mounted blank mold having a cavity adapted to form a bottle blank with its neck down, of auxiliary blank forming mechanism comprising reciprocably mounted upper and lower blow heads arranged for operative connection to the upper and lower ends, respectively, of said mold cavity, a reciprocable neck former or plunger arranged below said mold cavity and in operative relation to the lower end thereof, a movable bottom former or closure arranged above said mold cavity, a series of cams suitably mounted on a cam shaft, driving means operatively connecting said auxiliary mechanism with the cams on said cam shaft, and means arranged when set in action to rotate said cam shaft a predetermined limited distance and thereby to effect a complete cycle of blank forming operations automatically.

6. Apparatus for making glass bottles comprising the combination with a suitable table mounted to move with its upper surface substantially horizontal and having a passage extending vertically therethrough, and means for centering a mold over said passage, of a mold for forming a bottle blank inverted or neck down, a second mold for blowing such blank, still inverted, into a finished bottle, said molds being open at top and bottom and being adapted to be centered successively over said passage, a blowing head and bottom former mounted above said table, and a blowing head and neck former mounted below said table, the upper and lower sets of blowing heads and formers being arranged to coöperate in one position of the table with the upper and lower ends, respectively, of the blank mold when the latter is centered over said passage, a second bottom former mounted above said table and a second blowing head mounted below said table, such second bottom former and blowing head being arranged to coöperate in a second position of the table with the upper and lower ends, respectively, of the blowing mold when the latter is centered over said passage, and means for operating the several blowing heads and formers.

In witness whereof we have hereunto affixed our hands.

HENRY REEVES LOPER.
WM. H. MILLER.

Witnesses:
CARL G. HILGENBERG,
CARL V. STARKLOFF.